US008770615B2

(12) United States Patent
Bar Noy et al.

(10) Patent No.: US 8,770,615 B2
(45) Date of Patent: Jul. 8, 2014

(54) COLLAPSIBLE WHEELED STRETCHER

(75) Inventors: Ilan Bar Noy, Ramat Gan (IL); Hava Bar Noy, Ramat Gan (IL)

(73) Assignee: Next Generation Stretcher Ltd., Ramat Gan (IL)

( * ) Notice: Subject to any disclaimer, the term of this patent is extended or adjusted under 35 U.S.C. 154(b) by 20 days.

(21) Appl. No.: 13/258,524

(22) PCT Filed: Apr. 27, 2010

(86) PCT No.: PCT/IL2010/000341
§ 371 (c)(1), (2), (4) Date: Sep. 22, 2011

(87) PCT Pub. No.: WO2010/128498
PCT Pub. Date: Nov. 11, 2010

(65) Prior Publication Data

US 2012/0007340 A1 Jan. 12, 2012

(30) Foreign Application Priority Data

May 3, 2009 (IL) .......................................... 198502

(51) Int. Cl.
*B62B 1/00* (2006.01)

(52) U.S. Cl.
USPC .......................................................... 280/640

(58) Field of Classification Search
USPC ............... 280/23.1, 47.131, 47.24, 47.2, 640, 280/11.27; 5/627, 628; 296/20
See application file for complete search history.

(56) References Cited

U.S. PATENT DOCUMENTS

| | | | | |
|---|---|---|---|---|
| 2,276,256 | A | 6/1939 | Visness et al. | |
| 4,953,886 | A * | 9/1990 | Grant | 280/640 |
| 5,997,018 | A | 12/1999 | Lee | |
| 6,283,496 | B1 | 9/2001 | Dickmann | |
| 6,363,936 | B1 * | 4/2002 | McCormick et al. | 128/870 |
| 7,044,496 | B2 | 5/2006 | Holmes | |
| 7,131,666 | B1 | 11/2006 | Jenney | |
| 7,191,854 | B2 * | 3/2007 | Lenkman | 180/65.1 |
| 7,407,177 | B2 | 8/2008 | Darling | |
| 7,744,100 | B2 * | 6/2010 | Cole | 280/11.115 |
| 2005/0184478 | A1 | 8/2005 | Ruedy | |
| 2006/0273554 | A1 * | 12/2006 | Henry | 280/652 |
| 2007/0216117 | A1 | 9/2007 | Figel et al. | |
| 2007/0216118 | A1 | 9/2007 | Jackson et al. | |
| 2008/0265821 | A1 | 10/2008 | Theobald | |
| 2010/0176619 | A1 | 7/2010 | Cahaan | |

FOREIGN PATENT DOCUMENTS

WO 2010-128498 A1 11/2010

* cited by examiner

*Primary Examiner* — John Walters
*Assistant Examiner* — James Triggs
(74) *Attorney, Agent, or Firm* — Pearl Cohen Zedek Latzer Baratz LLP

(57) ABSTRACT

The present invention discloses a foldable collapsible wheeled stretcher on wheels, having handles for pulling and steering. The device is provided with dependent suspensions allowing mobility in rough and bumpy terrain while maintaining the stability of stretcher surface, reducing tilt and vibration that reach the wounded person being transported upon the stretcher. It is provided with folding or telescopic means allowing it to be carried upon the back or stowed in a small volume. The device enables rescue of injured people in an improved manner from (for example) regions which are not passable by vehicles, and may be pulled by a single rescuer instead of being carried by two to four. The device may be further used to transport material.

25 Claims, 11 Drawing Sheets

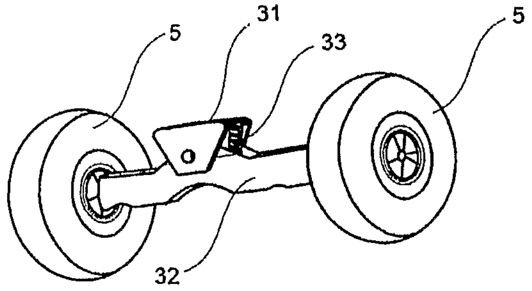
FIG 4
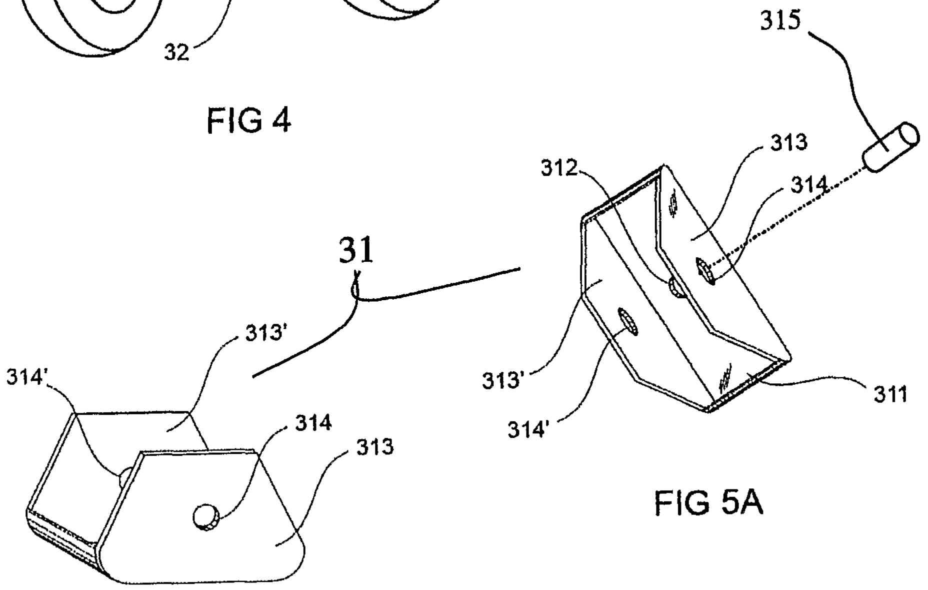
FIG 5A
FIG 5B
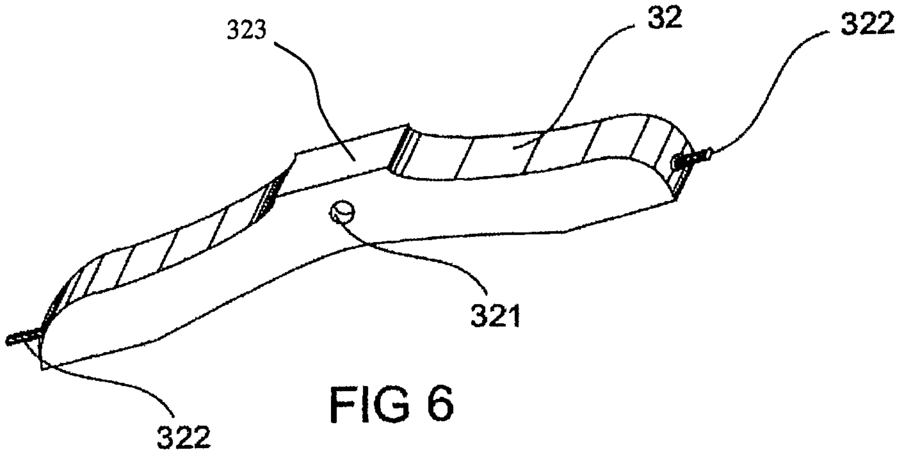
FIG 6

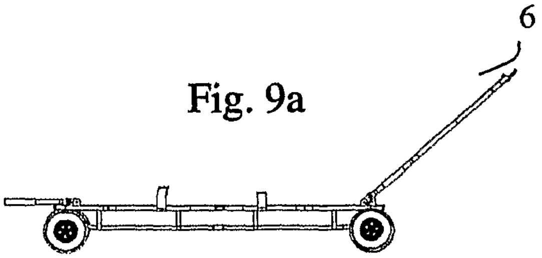
Fig. 9a
Fig. 9b
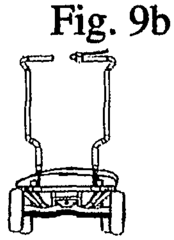
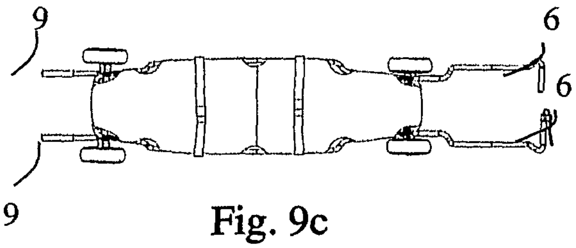
Fig. 9c
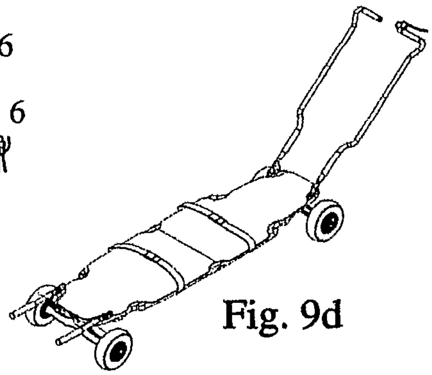
Fig. 9d

Fig. 10a
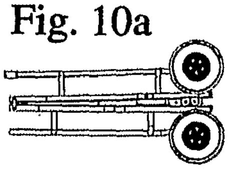
Fig. 10b
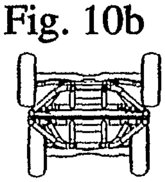
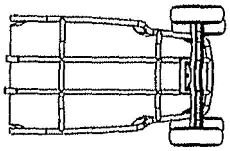
Fig. 10c
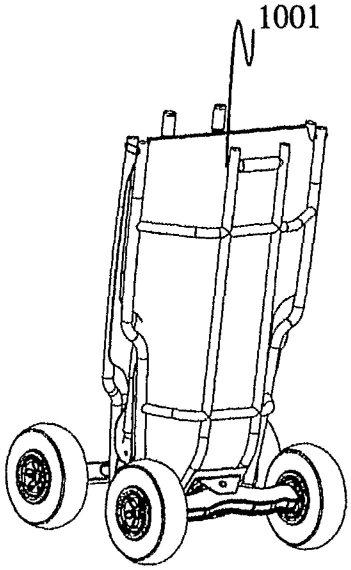
Fig. 10d

COLLAPSIBLE WHEELED STRETCHER

CROSS-REFERENCE TO RELATED APPLICATIONS

This application is a National Phase Application of PCT International Application No. PCT/IL2010/000341, International Filing Date Apr. 27, 2010, claiming priority of Israel Patent Application No. 198502, filed May 3, 2009, which are both hereby incorporated by reference.

FIELD OF THE INVENTION

The present invention relates to a device and method for transporting wounded personnel.

BACKGROUND OF THE INVENTION

In many situations such as military operations, rescue operations, climbing and caving expeditions, wilderness explorations and the like, it is common for the group to carry with it a stretcher for use in emergencies. It is common today for this stretcher to be collapsible or otherwise foldable, such that one member of the party can carry it on his back, and in case of need the stretcher can be unfolded and deployed. A wounded person can then be placed on the stretcher, which is then carried by two or four persons.

However, experience shows that carrying a stretcher bearing a wounded person for long distances and/or in rough terrain can be rather cumbersome and slows the progress of the party in reaching points where medical treatment may be administered. In some cases this endangers the life of the wounded person. In the case of military operations during combat, the slow progress caused by the stretcher, and requirement of multiple stretcher bearers to carry the stretcher, may endanger the other soldiers in the party and hamper the unit's ability to achieve its objectives.

Hence, an improved method for transporting wounded personnel is still a long felt need.

BRIEF DESCRIPTION OF THE DRAWINGS

In order to understand the invention and to see how it may be implemented in practice, a plurality of embodiments will now be described, by way of non-limiting example only, with reference to the accompanying drawings, in which

FIG. 4 shows the suspension.

FIG. 5 shows the connector between chassis and suspension.

FIG. 6 shows the central axis of the chassis.

FIG. 9 shows the stretcher and its components.

FIG. 10 shows the stretcher in a folded position.

SUMMARY OF THE INVENTION

Figure 1:
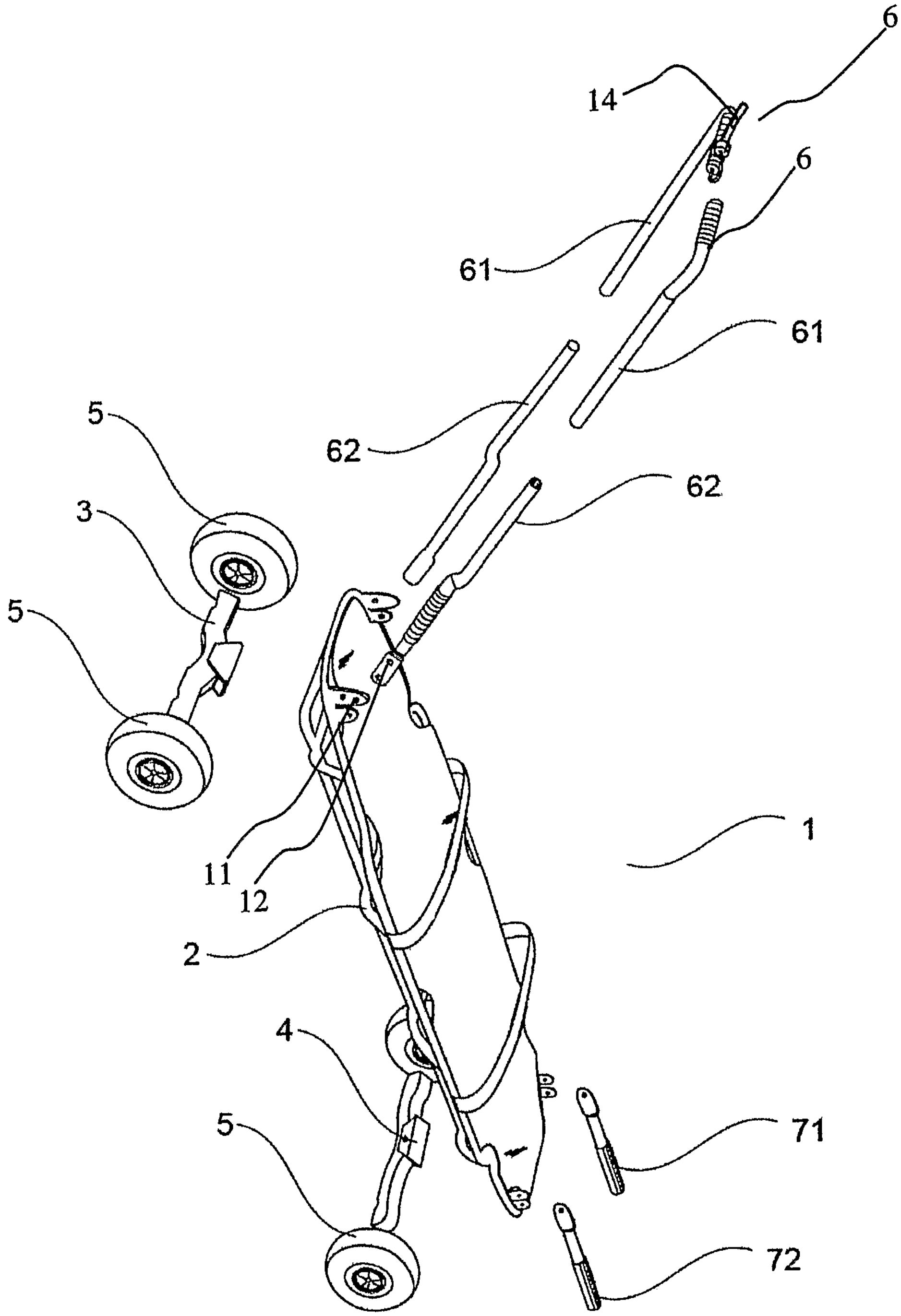
FIG. 1 depicts the stretcher in complete and exploded views.

The present invention comprises a system and method for bearing wounded personnel comprising a wheeled, foldable stretcher. The wheels of the device allow it to be pulled by a single person, even when the stretcher bears upon it a wounded person, and even in relatively rough and bumpy terrain.

Generally speaking the invention is a collapsible wheeled stretcher having four wheels, with two wheels each on two dependent suspensions. The suspensions may be additionally supplied with independent shock absorbing means. The suspensions take the form of simple solid axles upon which the wheels revolve. These axles may rotate in the horizontal plane to allow the stretcher to turn left/right, and may also rotate in a vertical plane allowing one wheel to rise while the other stays level to the ground. The stretcher is pulled by means of a pulling handle or rope that allows the person pulling the stretcher to rotate the front suspension in the horizontal plane. The stretcher is collapsible by means known to those skilled in the art, such as by folding or by telescopic collapse.

In some embodiments of the invention a steering mechanism is employed whereby turning the steering handles and pulling the stretcher causes tilting of the transport surface and consequent change in the wheel angles to a desired direction. Due to the geometry of the device, the tilt in the chassis will cause a corresponding turn in the rear wheels in the direction opposite to the turn of the front wheels, tightening the turn radius and increasing the stability of the device during cornering.

In some embodiments of the invention the stretcher size may be modified by means of members having adjustable length, by telescopic means or other methods as will be obvious to one skilled in the art.

In some embodiments of the invention first aid devices may be supplied upon or within the device.

It is within provision of the invention to provide a number of folding handles attached to the device in order to enable lifting into an ambulance (or for crossing a river, tc). A safety frame is also supplied to maintain the load of the stretcher (be it a person or supplies) in place. Straps are provided to allow affixing of an injured person or supplies into the stretcher securely.

In certain embodiments, the device is supplied with motoring means and navigation means.

While the invention is susceptible to various modifications and alternative forms, specific embodiments thereof have been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The following description is provided, alongside all chapters of the present invention, so as to enable any person skilled in the art to make use of said invention and sets forth the best modes contemplated by the inventor of carrying out this invention. Various modifications, however, will remain apparent to those skilled in the art, since the generic principles of the present invention have been defined specifically to provide a means and method for providing a collapsible wheeled stretcher.

In the following detailed description, numerous specific details are set forth in order to provide a thorough understanding of embodiments of the present invention. However, those skilled in the art will understand that such embodiments may be practiced without these specific details. Reference throughout this specification to "one embodiment" or "an embodiment" means that a particular feature, structure, or characteristic described in connection with the embodiment is included in at least one embodiment of the invention.

The term 'plurality' refers hereinafter to any positive integer e.g, 1, 5, or 10.

The term 'dependent suspension' refers hereinafter to a suspension system for a wheeled vehicle wherein two wheels are attached to a shared, rigid axle (also known as a solid axle). The wheels may spin independently, but movement of the axle will cause coupled movements of the wheels, as they are both attached to the axle. Generally the axle may be allowed several degrees of freedom such as rotation in horizontal and vertical directions, for example perpendicular to the wheel rotation axis. The dependent suspension assures constant camber.

The term 'independent suspension' refers hereinafter to a suspension system for a wheeled system wherein the wheels are allowed completely independent motion, as is the case for most passenger vehicles such as the wishbone or A-arm suspensions.

The term 'wheel axis' refers hereinafter to the axis about which a wheel rotates when a vehicle is traveling in a straight line.

The term 'vertical axis' refers hereinafter to an axis about which an axle rotates in order to allow a vehicle to turn. The vertical axis will generally be perpendicular to the plane upon which the vehicle travels.

The term 'horizontal axis' refers hereinafter to an axis about which an axle rotates in order to allow the wheels to rise and fall. The horizontal axis will generally be in the direction of travel.

The term 'load' refers hereinafter to an object that may be borne by the stretcher of the invention including a wounded person, a healthy person, first aid supplies, equipment, food, camping gear, climbing gear, hunting gear, weapons, ammunition, communications equipment, etc.

In a preferred embodiment of the invention exemplified in the exploded view of FIG. 1, a stretcher 1 is provided comprising the following main parts: a central chassis 2, a front suspension 3, a rear suspension 4, four wheels 5, front pulling handles 61-62, and rear lifting handles 71-72.

Figure 2:
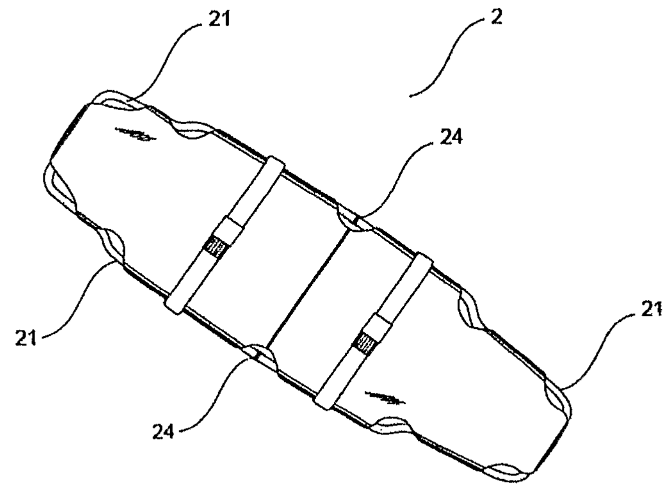
FIG. 2 shows the chassis of the stretcher in top view.
Figure 3:
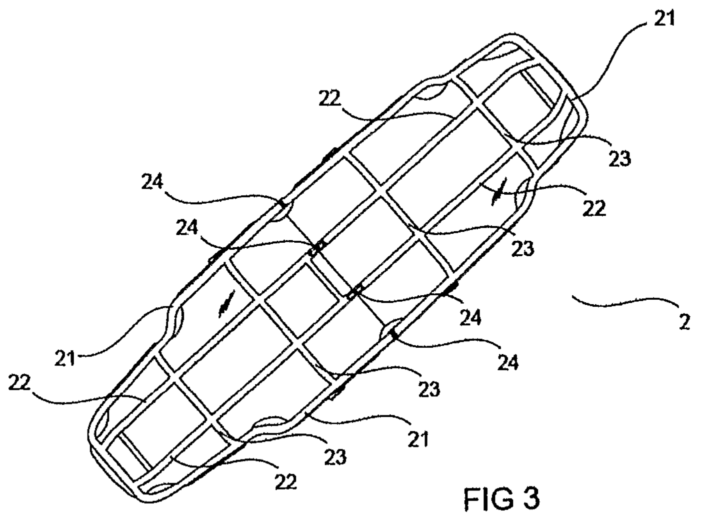
FIG. 3 shows the chassis in bottom view.

The central chassis 2 is shown in bottom view in FIG. 2, and in top view in FIG. 3. The central chassis 2 is comprised of a peripheral frame 21 in a form adapted to be able to bear a prone or supine human body. This frame will in some embodiments be of dimensions similar to those found in standard stretchers, and may in some embodiments assume a roughly rectangular form. In some embodiments, a hinged section 24 allows the device to fold into two parts. It is within provision of the invention to additionally or alternatively provide further hinged sections and telescoping elements, allowing more compact folded and/or collapse, by hinge means and/or telescoping means and/or folding means as will be obvious to one skilled in the art.

In one embodiment of the invention, the length of the chassis is 190 cm, and the width is 56 cm, approximately. However, other dimensions fall under purview of the invention, and it is further within provision of the invention that the actual dimensions of the device (including its length and width) be adjustable by suitable use of telescoping sections or other means as will be clear to one skilled in the art.

In order that the central chassis be strong enough to carry heavy loads and be stable under high velocity operation and/or in rough terrain, it is preferable that the chassis be supplied with reinforcing cross-members as shown for example in the top view of FIG. 3, comprising both length crossmembers 22 and width crossmembers 23. The length crossmembers 22 as well as the peripheral framework 21 are in this embodiment both supplied with hinged sections 24 in order that the device be foldable. In order that the central chassis be comfortable for the person borne upon it and in order to more firmly affix the injured person into the stretcher, it is preferable that the cross members 22,23 be lower (in the horizontal plane) than the chassis peripheral members 21 by (for example) a few cm., decreasing the possibility that the injured person (or limbs thereof, or material being borne by the stretcher) will roll out of the stretcher. Fabric sheets, foam mattresses, air mattresses, or the like may be placed upon or around the central chassis as is the case in standard stretchers for purposes of comfort, waterproofing, bulletproofing, and the like. The sheets, mattresses or other materials placed upon or around the chassis will in most embodiments fold along with the stretcher framework, and thus do not hinder the folding thereof. Likewise, in some embodiments of the invention the chassis is covered with a rigid substrate such as a backboard having two halves, allowing the backboard to be folded along with the stretcher in a single folding operation.

Folding of the Stretcher

The stretcher of the invention is designed to be folded or otherwise collapsed when not in use, and therefore it is within provision of the invention that the central chassis 2 (FIGS. 2,3) may be folded at one or more points, such that the different sections of the chassis (between folding points) fold one upon another, in the fashion of an accordion fold, map fold, other fold, telescoping action, or other means as will be clear to one skilled in the art. The simple case of a single folding axis about which two halves fold, is illustrated for example with the unfolded state being shown in FIG. 9*a*-*d* and the folded configuration being shown in FIG. 10*a*-*d*. As shown in FIG. 3, in order that the folding of the chassis 2 be possible, the peripheral frame 21 and the lengthwise supporting members 22 are provided with hinged sections 24. The hinge mechanism 24 is preferably of a type that allows locking of the hinge, preventing folding of the device when deployed, while allowing unlocking of the hinge and subsequent folding of the stretcher when not in use.

When the stretcher is not in use it is possible either to carry it in its folded configuration (for example on one's back in the manner of a backpack) or pull it, either in its unfolded configuration or in a folded configuration. It is within provision of the invention that in the folded configuration, the wheels are coplanar and extend beyond the other parts of the folded stretcher, allowing the stretcher to travel on its wheels similar to the fashion in which a wheeled trolley suitcase may be pulled. Such a configuration is shown for example in FIG. 10*d*. In order that the pulling operation be easy, the device is provided with a pulling handle 1001 attached to the chassis of the stretcher, as shown in FIG. 10*d*.

Suspension System of the Stretcher

The front suspension system 3 and rear suspension 4 (as shown in FIG. 1) are similar, and thus only the front suspension will be described in detail, with reference to FIG. 4. The suspension systems include: a connector 31, an axle 32, and two springs 33. Wheels 5 are attached to the end of the axle 32. The connector 31 is shown in detail in FIG. 5*a*,*b*, and is in the embodiment shown designed in the form of a central rectangular prism 311 having a hole 312. From this central rectangular prism 311, trapezoidal, triangular, or other geometrical forms 313, 313' are attached at right angles. The lower parts of these sections 313,313' also have holes 314, 314' designed to allow the connector 31 to attached to the axle 32. The connector 31 is connected to the chassis 2 by means of a cylindrical pin 315 which penetrates hole 312 and a corresponding hole on the chassis, and allows the connector 31 to rotate relative to the stretcher chassis about the axis of the pin 315.

The central axle 32 is shown in detail in FIG. 6. This axle is shaped in this example roughly in the form of a bar. The central portion of this bar includes a horizontal hole 321 designed to allow a pin (not shown) to rotatably attach the axle 32 to the connector 31 by penetrating hole 321 in the axle and holes 314,314' in the connector 31. As will be appreciated by one skilled in the art, this manner of connection allows relative rotation between the connector 31 and axle 32 about the axis of the connecting pin. This degree of freedom in effect allows the wheels rise and fall to conform to the terrain on which they travel. In each of the sides of the central axis 32 there is a further wheel pin 322 designed to rotatably attach the wheels 5 to the axle. In order to dampen vibrations of travel upon rough surfaces, the suspension 3 includes two springs 33 (FIG. 4) connecting the lower part of the connector 31 to the upper part of the central axis 32.

Figure 7:
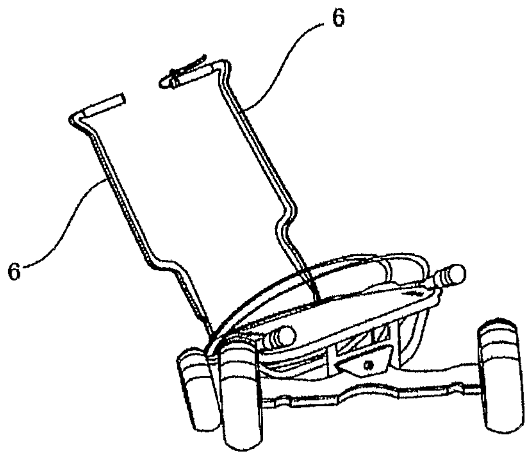
FIGS. 7,8 show the stretcher in different positions.
Figure 8:
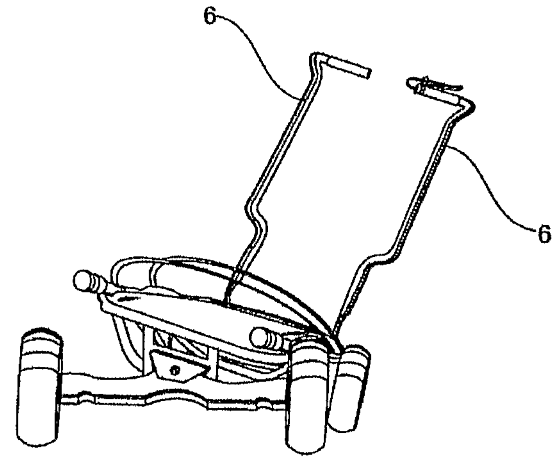

The design of the dependent suspension allows the stretcher to be dragged on surfaces that are not flat without unduly affecting the horizontal disposition of the stretcher frame. This is due to the action of the suspension which allows movement of the wheels about the three axes described above, namely the "wheel axis" of pin 322, the "horizontal axis" of pin penetrating hole 321 (FIG. 6), and the "vertical axis" of the pin penetrating the hole 312 (FIG. 5*a*). As will be appreciated by one skilled in the art, rotations of the axle about the horizontal axis and vertical axis are coupled when the wheels contact the ground. Thus when the axle 32 rotates about the vertical axis 312, the right wheel (for instance) will rotate ahead of the left wheel allowing a left turn, and due to the aforementioned coupling, a corresponding rotation will occur around the horizontal axis 321 causing the connector 31 and stretcher to tilt towards the left, as is shown in FIGS. 7,8. The rear suspension system 4 of the stretcher 1 is similar to that of the front suspension 3 and its operation equivalent.

Figure 11:
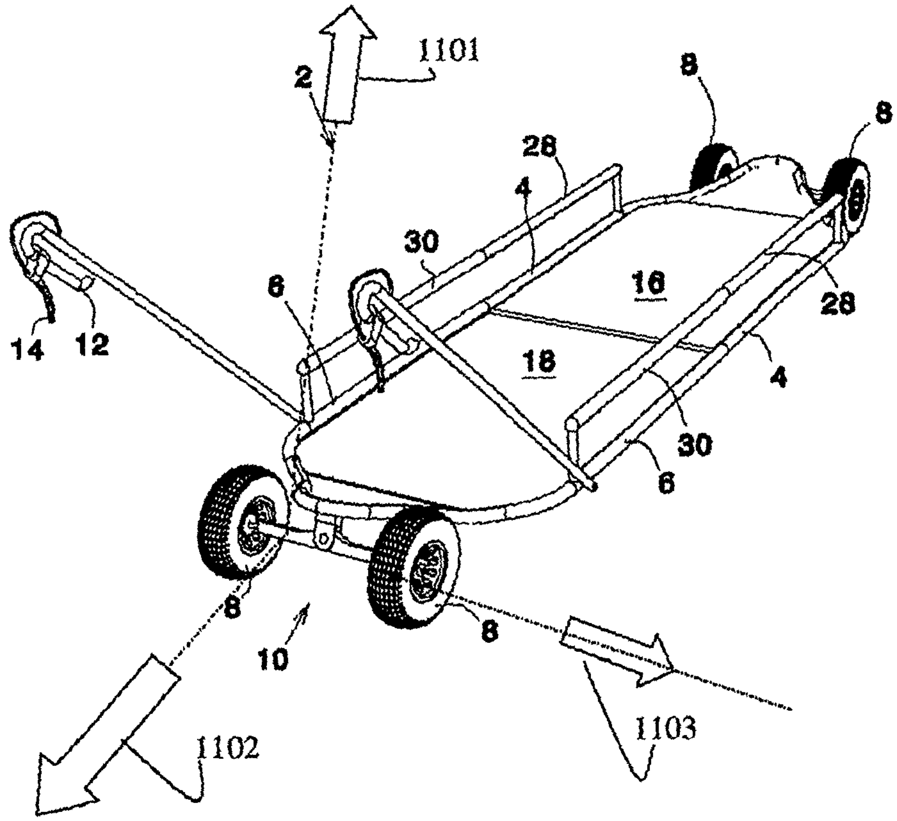
FIGS. 11-15 show a different embodiment of the stretcher.

The aforementioned axes of rotation are also illustrated explicitly in FIG. 11, where the vertical axis 1101 allows steering of the stretcher, the horizontal axis allows the wheels to rise and fall, and the wheels spin about the wheel axis 1103.

The wheels 5 of the stretcher 1 are connected by the pins 322 (FIG. 6) of the axle 32 (on its front part). It is within provision of the invention to use different suspension means that will be familiar to those skilled in the art, for example such as those used in the mountain board, skateboard, jeeps, 4×4 vehicles, rovers, cars, and the like. The axle 32 has a planar section 323 that is suitable to bear a corresponding planar section of the stretcher, thereby firmly coupling the axle 32 to the stretcher while allowing a rotational degree of freedom to the axle 32 (as the axle 32 may rotate in the horizontal plane, relative to the stretcher).

The front pulling handle 6 is connected to the front part of the central chassis 2, as shown for example in FIGS. 1,7,8, and 9. The front handles 6 are made of two tubes 61,62 (FIG. 1) which are connected to the right and left sides of the front part of the central chassis 2 by means of a hinged connection 11, in order that the handles 6 be able to rotate relative to the stretcher 1. When the stretcher 1 is not in use, the handles 6 may be folded on the stretcher. The hinged connection preferably includes a locking mechanism for stopping the rotation of the handle relative to the stretcher, allowing the user to fix the handle in a desired position comfortable for the person pulling the stretcher. By so doing the user ensures maximal steering action. This may be accomplished for instance by means of pins penetrating holes 12 in the handle and corresponding holes 11 body of the stretcher.

The rear pulling handles 71, 72 are connected to the rear part of the central chassis 2, as shown for example in FIGS. 1, 9. The rear handles 71, 72 in some embodiments comprise two short poles connected to the right and left sides of the rear part of the central chassis 2. The handles 71, 72 are connected to the chassis of the stretcher by means of a hinged connected allowing the handles to be folded.

The stretcher 1 in a folded state is shown in FIG. 10*a-d*.

It is within provision of the invention that the springs 33 (FIG. 4) of the suspension be adjustable in one or more ways. In some embodiments of the invention this is accomplished by allowing the springs to slide radially outward along the axles 32, with provision to lock the springs into place as desired. As will be clear to one skilled in the art this will tend to increase the stiffness of the suspension due to the increased torque provided by the spring at an increased radius from the center of rotation 314. In other embodiments of the invention the springs may be adjusted to increase or decrease their tension when in equilibrium, such as by means of a screw that raises or lowers one end of the spring. By these means and/or similar such as will be obvious to one skilled in the art, the stiffness and handling characteristics of the cart can thus be adjusted to different occupant weights and different terrain.

It is within provision of the invention that the handle 61,62 be provided as two independent parts, or as a single connected unit. As will be obvious to one skilled in the art the same provisions may be made for the rear handles. It is further within provision of the invention that straps, rope, bungee cord, harness, or the like be used instead of handles for purposes of pulling the device.

It is within provision of the invention the device may be braked either by a brake handle 14, by pulling from the rear by means of handle or rope, by rope-operated brake cable from the front or rear, by brakes operated by the vehicle occupant, and combinations thereof. Similar braking means will be obvious to one skilled in the art, and it is within provision of the invention to supply such means in some embodiments.

It is within provision of the invention that the stretcher comprise connecting means allowing the stretcher to be pulled by a standard tow hook, trailer hitch, tractor hookup, tractor hitch, medevac helicopter cable, a.t.v and the like.

It should be emphasized that due to the solid-axle construction of the front and rear suspension, a naturally stable turning mechanism results whereby (for instance) a left turn of the front axle causes a leftwards tilt of the device and a corresponding right turn of the rear axle, tending to decrease the turn radius and improve the handling characteristics of the device.

It is within provision of the invention that it be made compatible with the various fittings in an ambulance, allowing it to be easily loaded and locked into place in ambulances transporting the stretcher.

It is within provision of the invention that the wheeled stretcher described be capable of transporting wounded personnel, first aid equipment, water, food, weapons, shelter such as tents, communications equipment, and other supplies as may be required or desired by the users. As will be appreciated, the multi-purpose nature of the stretcher (having both medical and logistical uses) is thereby exploited, making movement of independent units such as military units or exploration teams easier even in rough terrain.

It is within provision of the invention that the device may be pulled or pushed from low angles by means of rope or handles as described above. In this way, the stretcher may for example be pulled by a kneeling or crawling soldier who must remain low to avoid detection or enemy fire.

Another embodiment of the invention is depicted in FIGS. 11-15. The main difference between this embodiment and that previously illustrated is that the main chassis of the stretcher in the second embodiment is not foldable, but rather is constructed of two telescoping segments allowing the stretcher to be collapsed in telescopic fashion.

FIG. 11 illustrates an isometric schema of a different, telescopically adjustable embodiment of the collapsible wheeled stretcher. Visible in this figure are the stretcher internal telescopic pole 4, external telescopic pole 6, wheels 8, steering mechanism that operates by tilting 10, pulling and steering handle 12, brake handle 14, upper board 16, bottom board 18, telescopic internal rail 28, and telescopic external rail 30.

Figure 12A:
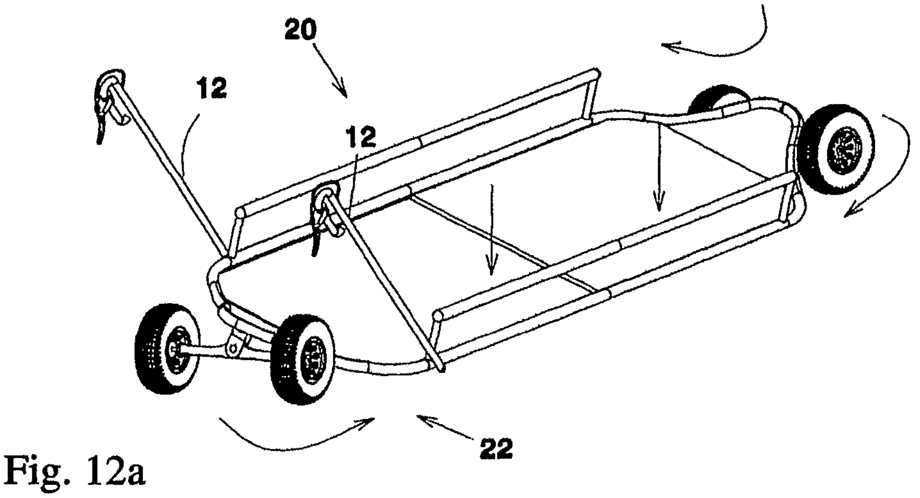

FIG. 12*a* illustrates an isometric schema of the collapsible wheeled stretcher 20 during a turn according to the present invention. The pulling and steering handle 12 is pulled to the left, causing the front axle 22 to rotate left while the stretcher also tilts to the left.

Figure 12B:
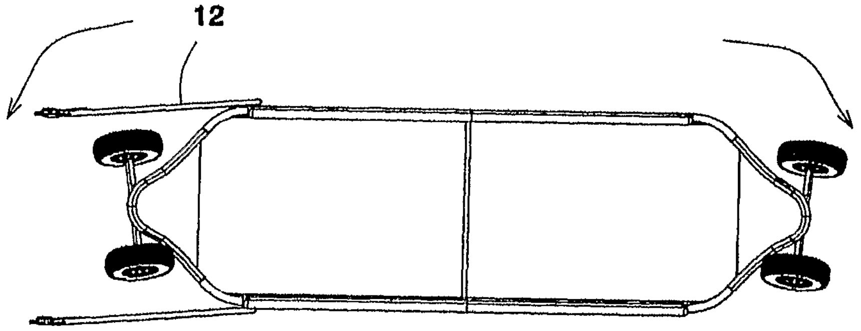

FIG. 12*b* illustrates the stretcher undergoing the same turn from a top view, illustrating the due to the tilt of the stretcher 20, the rear wheels will undergo a corresponding rotation to the front wheels, allowing a tighter turn radius and better compliance with the ground in rough terrain.

Figure 13:
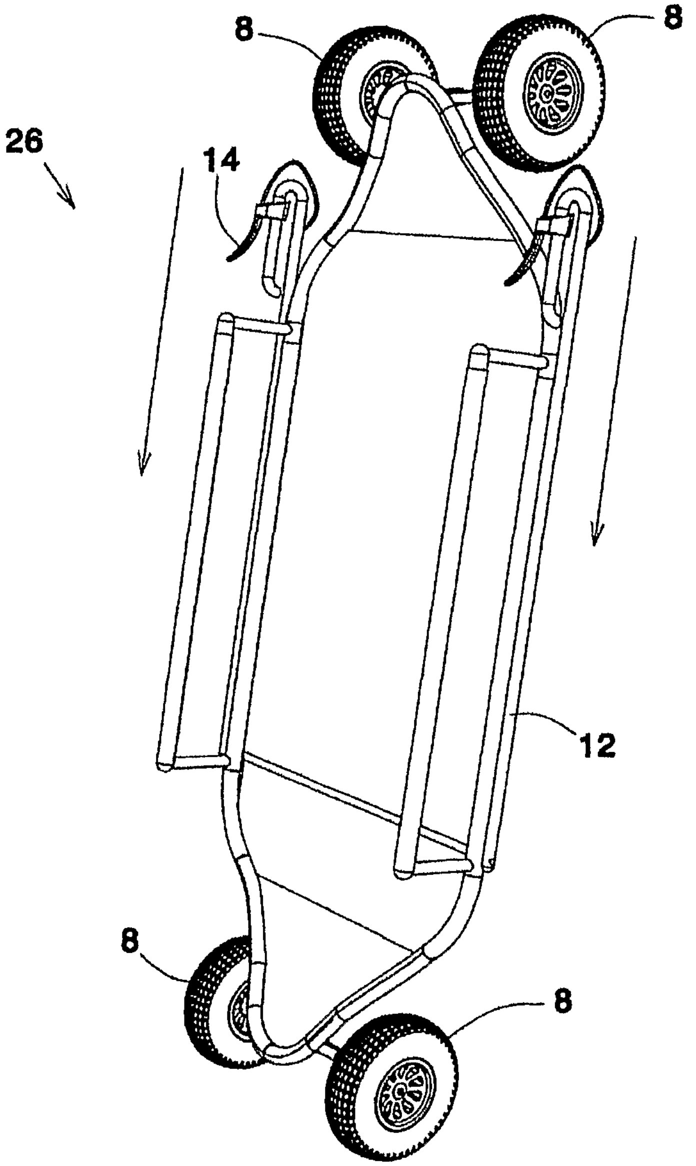

FIG. 13 illustrates an isometric schema of a collapsible wheeled stretcher in a folded mode (26) according to the present invention. Wheels (8), pulling and steering handle (12), brake handle (14) are visible in the figure. In this configuration, the device may be pulled (e.g. by a rope) while carrying a load such as a wounded person or material.

Figure 14:
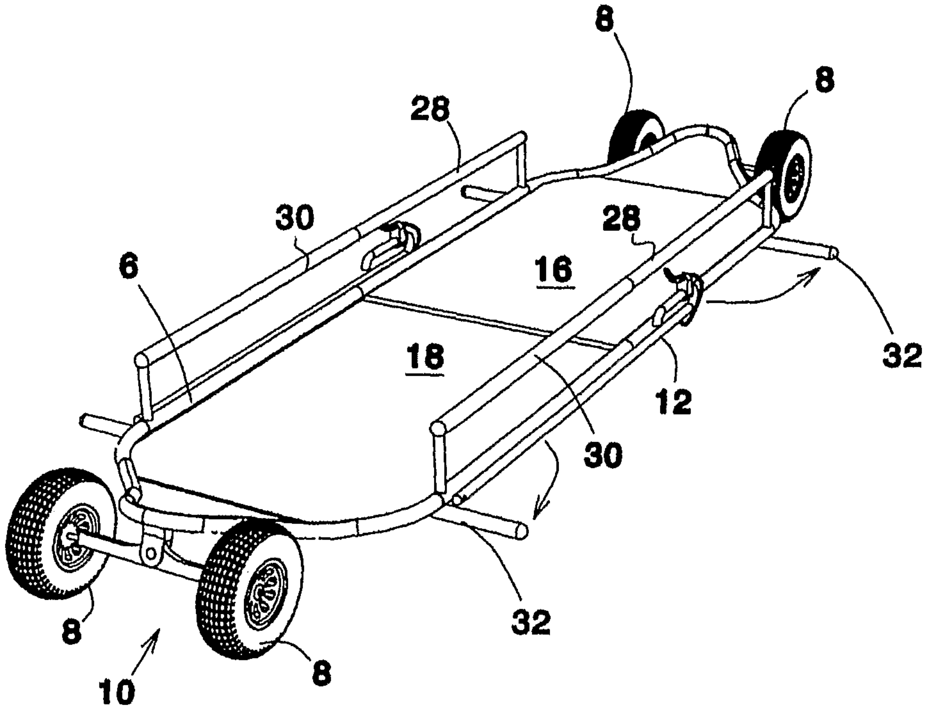

In FIG. 14 an isometric view of a collapsible wheeled stretcher is shown in a configuration where the pulling/steering handles 12 are folded and the lifting handles 32 are folded outwards. Visible in the figure are the stretcher's external telescopic pole 6, wheels 8, steering mechanism that operates as before by tilting 10 of the stretcher, the folded pulling and steering handle 12, upper board 16, bottom board 18, telescope internal rail 28, telescope external rail 30, and folding lifting handles 32.

Figure 15:
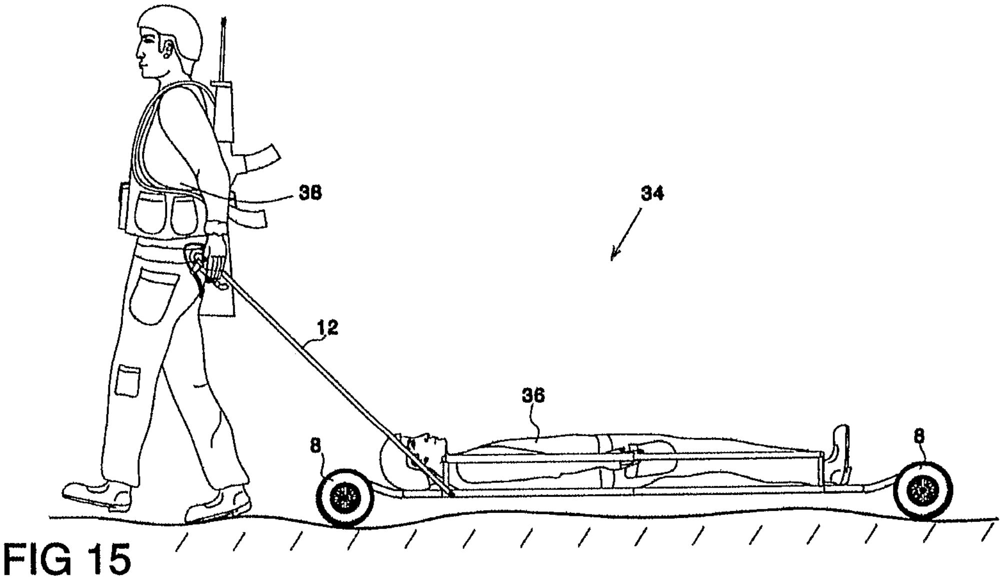

FIG. 15 illustrates a rescue of an injured person using an embodiment of the collapsible wheeled stretcher of the present invention 34 showing the wheels 8, pulling and steering handle 12, injured person 36, and rescuer 38.

Operation of the Stretcher

The stretcher of the present invention is pulled and transported by the rescuer, who can stop the field stretcher by pressing on hand brakes 14 (FIG. 11) installed in the gripping handles of the pulling and steering handles 12. By this means, when an injured person is being transported downhill or uphill, uncontrolled rolling is easily prevented.

According to one embodiment of the invention, it is possible to carry the field stretcher described in the present invention on the back of the rescuer using straps or a carrying device when said stretcher is folded in a telescopic manner and the dragging and steering handles are folded.

It is within provision of the invention that the stretcher be suitable for carrying equipment such as for example ammunition, weapons, hunting and camping gear, food, water, warfare equipment, and so on.

It is within provision of the invention that a backboard in one or more sections be used on the stretcher, to assist in rescue of spinal trauma victims, and for other contingencies as will be obvious to one skilled in the art.

Advantages of use of the stretcher of the invention will be clear from the description above. Amongst these advantages are that the stretcher may be pulled on wheels having suspensions, allowing transport of a wounded person by a single rescuer, in bumpy or otherwise difficult territory. Another advantage of the stretcher of the current invention is that considerable loads material may be transported on the stretcher instead of or in addition to a wounded person, decreasing the load and fatigue on party members. A key aspect of the invention is that the stretcher may be pulled by a single person when loaded by a wounded person and/or material, as opposed to two or four people required to transport a traditional stretcher. Use of this stretcher can therefore speed the evacuation of the wounded person and save lives.

A third embodiment of the invention pertains to the stretcher as described in the embodiments above, provided with a motor and navigation means allowing the device to be transported to locations without requiring exertion on the part of the rescuer. The motor may be guided by a rescuer or may be operated automatically by use of the navigation means.

Many unmanned transportation systems and vehicles are known today. Such systems generally include motoring means and navigation means. These devices are well known in business and industry and require no further explanation.

The stretcher employing such a system includes motoring means such as an electric motor, gasoline motor, or combination hybrid motor, and navigation means. Thus a wounded person may be loaded upon the stretcher, which may then be guided remotely or by local automatic navigation means to arrive at selected waypoints entered into the navigation system. By these means wounded personnel may be evacuated from the battlefield or other zones without requiring rescuers to carry or pull the stretcher, and without requiring real time remote control.

It is within provision of the invention that the stretcher be folded into two or more sections, in an accordion fold, map fold, or other folds as will be known to one skilled in the art. In other embodiments of the invention the stretcher is collapsible by means of telescoping mechanisms whereby certain extruded structural members may be pushed or pulled into corresponding recesses in other extruded structural members.

It is within provision of the invention that the central support members of the stretcher be non-coplanar with the outer supporting framework 21 (FIG. 3) of the device, such that a basket-like form is created that more stably contains the contents of the stretcher, and more comfortably holds human occupants.

It is within provision of the invention that a suspended hammock-like mesh support the occupant of the stretcher, further isolating said occupant from vibration and tilt experienced by the wheels of the stretcher.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

The invention claimed is:

1. A collapsible, steerable wheeled stretcher comprising:

a. a stretcher chassis comprising a largely rectangular outer frame reinforced by rigid crossmembers, said stretcher having a head end and a foot end;

b. a front dependent suspension and a rear dependent suspension rotatably attached to said chassis at said head end and said foot end, respectively, wherein each of said dependent suspensions comprises an axle, connector, springs and wheels which are all arranged such that each of said suspensions allows rotational movement of said wheels around three axes, namely rotational movement around said axle, left-to-right rotational movement around a vertical axis and up-and-down rotation around a horizontal axis;

c. one or more front pulling means attached to said stretcher chassis, adapted for pulling said stretcher and steering said stretcher by means of rotating said front suspension;

wherein said stretcher is for transporting a person to safety over rocky terrain without substantially affecting the horizontal disposition of said chassis.

2. The stretcher of claim 1 further providing one or more rear pulling means attached to said stretcher adapted for pulling said stretcher.

3. The stretcher of claim 1 wherein rotation of said front suspension axle around the vertical axis causes further rotation of said front suspension axle about the horizontal axis, which in turn causes rotation of said rear suspension axle about said vertical axis in a direction opposite said rotation of said front suspension axle about said vertical axis.

4. The stretcher of claim 1 further providing brakes operated by a brake lever upon said front handles, said brakes adapted to stop the rotation of said wheels.

5. The stretcher of claim 1 wherein said stretcher collapses by means of telescopic collapse of a subset of said chassis members into another subset of said chassis members.

6. The stretcher of claim 1 wherein said stretcher is foldable into two or more sections by means of hinged sections on said chassis members in such a manner that said wheels are still operable to transport said stretcher.

7. The stretcher of claim 6 wherein said stretcher is adapted to be transported on a person's back for ease of transport and rapidity of deployment.

8. The stretcher of claim 6 wherein said hinged section is adapted to be locked to prevent relative movement of said sections.

9. The stretcher of claim 6 wherein said stretcher is adapted to be locked to an A.T.V.

10. The stretcher of claim 1 further providing a suspended hammock-like mesh adapted to support the occupant of said stretcher, further isolating said occupant from vibration and tilt experienced by the wheels of the stretcher and adapted to allow a person to lie upon said mesh and be supported by said stretcher.

11. The stretcher of claim 1 further providing straps adapted to strap a load into said stretcher.

12. The stretcher of claim 1 wherein said frame has a basket-like form adapted for transport of items selected from the list consisting of: wounded personnel, first aid equipment, camping gear, food, water, survival gear, climbing gear, weapons, warfare equipment, shelter, signaling equipment, and research equipment.

13. The stretcher of claim 1 further providing motoring means adapted to assist said rescuer in said transport of said stretcher.

14. The stretcher of claim 1 wherein said pulling means is adapted to be operated from near the ground, allowing a crawling person to pull said stretcher by said pulling means.

15. A method for transport of wounded persons comprising the steps of:

a. providing collapsible, wheeled stretcher comprising a stretcher chassis; a front dependent suspension and a rear dependent suspension, and one or more front pulling means for transporting a person to safety over rocky terrain without substantially affecting the horizontal disposition of said chassis;

b. placing said wounded person upon said collapsible wheeled stretcher;

c. pulling said wheeled stretcher by said pulling means;

wherein said stretcher collapses by telescopic collapse of a subset of said chassis members into another subset of said chassis members.

16. The method of claim 15 further providing one or more rear pulling means attached to said stretcher adapted for pulling said stretcher.

17. The method of claim 15 further providing a brake lever upon said front handles and brakes attached to said wheels, said brakes adapted to stop the rotation of said wheels.

18. The method of claim 15 wherein said stretcher is foldable into two or more sections by means of hinged sections on said chassis members in such a manner that said wheels are still operable to transport said stretcher.

19. The method of claim 15 wherein said stretcher is adapted to be transported on a person's back for ease of transport and rapidity of deployment.

20. The method of claim 18 wherein said hinged section is adapted to be locked to prevent relative movement of said sections.

21. The method of claim 15 further providing a suspended hammock-like mesh adapted to support the occupant of said stretcher, further isolating said occupant from vibration and tilt experienced by the wheels of the stretcher adapted to allow a person to lie upon said mesh and be supported by said stretcher.

22. The method of claim 15 further providing straps adapted to strap a load into said stretcher.

23. The method of claim 15 adapted for transport of items selected from the list consisting of: wounded personnel, first aid equipment, camping gear, food, water, survival gear, climbing gear, weapons, warfare equipment, shelter, signaling equipment, and research equipment.

24. The method of claim 15 further providing motoring means adapted to assist said rescuer in said transport of said stretcher.

25. A collapsible, steerable wheeled stretcher comprising:

a. a stretcher chassis comprising a largely rectangular outer frame reinforced by rigid crossmembers, said stretcher having a head end and a foot end;

b. a front dependent suspension and a rear dependent suspension rotatably attached to said chassis at said head end and said foot end, respectively, wherein each of said dependent suspensions comprises an axle, connector, springs and wheels which are all arranged such that each of said suspensions allows rotational movement of said wheels around three axes, namely rotational movement around said axle, left-to-right rotational movement around a vertical axis and up-and-down rotation around a horizontal axis;

c. one or more front pulling means attached to said stretcher chassis, adapted for pulling said stretcher and steering said stretcher by means of rotating said front suspension;

wherein said stretcher is for transporting a person to safety over unpassable terrain without substantially affecting the horizontal disposition of said chassis.

* * * * *